Jan. 28, 1930. G. MEIER 1,744,786
METHOD OF JOINING TOGETHER PLATES OR THE LIKE
Filed Feb. 17, 1928
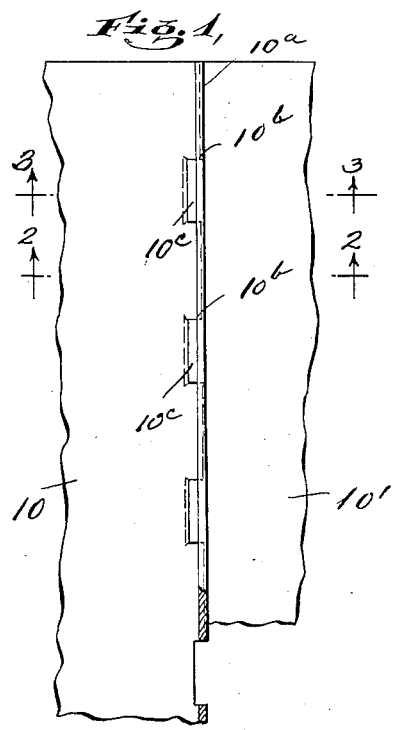
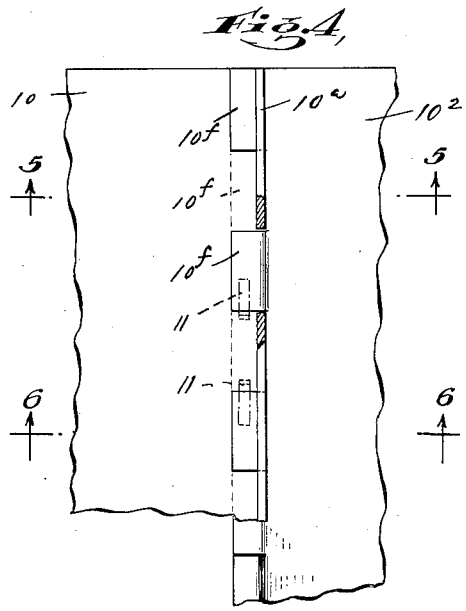
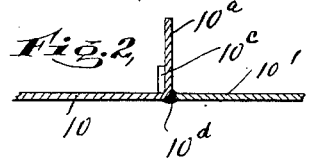
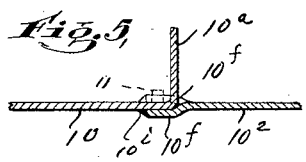
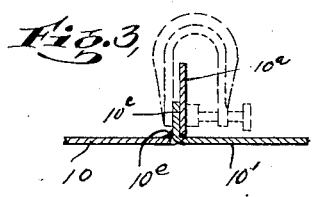
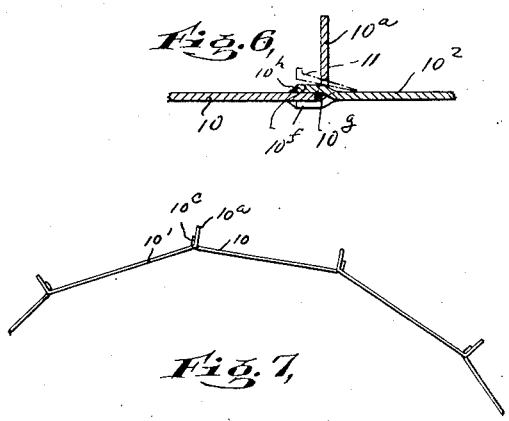
INVENTOR
Gustav Meier
BY
ATTORNEY Patented Jan. 28, 1930

1,744,786

UNITED STATES PATENT OFFICE

GUSTAV MEIER, OF CORAOPOLIS, PENNSYLVANIA

METHOD OF JOINING TOGETHER PLATES OR THE LIKE

Application filed February 17, 1928. Serial No. 255,097.

This invention relates to a method of joining plates or sides of plates together in the manufacture of hulls, tanks for gasoline or the like, etc., and has for its main object to provide a construction whereby the cost of labor will be greatly reduced and manufacture simplified.

A further object is to provide a seam joint dispensing with rivets.

And still another object is to provide a construction that will effectively resist shear and similar strains.

With these and other objects in view my invention consists in a new method of joining plates or sides of plates as will be hereinafter fully described and defined in the appended claims.

In the accompanying drawing which forms part of this specification and in which similar reference characters denote corresponding parts, Fig. 1 is a top plan view of two plates or plate sections to be joined by my new method; Fig. 2 is a cross section on line 2—2 of Fig. 1 seen in the direction of the arrows; Fig. 3 is a similar section on line 3—3 of Fig. 1 as seen in the direction of the arrows; Fig. 4 is a similar plan view to Fig. 1 of a modified structure; Figs. 5 and 6 are cross sections on lines 5—5 and 6—6 of Fig. 4 respectively, and Fig. 7 is a diagrammatic top plan view of a part of a tank constructed according to my new method.

Referring first to the form of construction shown in Figs. 1 to 3 inclusive, 10, 10' denote two plates or plate sections to be joined together by my new method. To this end one of the plates or plate sections at its edge at which the seam or joint is to be formed is bent at an angle of 90° as at $10^a$ and at the corner formed is recessed or slotted at uniform suitable intervals as at $10^b$. The other plate or plate sections 10' is formed at the opposite edge with bends $10^c$ also arranged at a right angle to said plate and which in number correspond to that of the recesses or slots $10^b$. The bends $10^c$ serve as tenons and are adapted to be passed through the recesses or slots $10^c$ so that the adjoining edges of the two plates 10, 10' become interlocked with one another. After the edges are thus interlocked the same are welded, using continuous welding along the corner at the bottom face of the plates and intermittent welding along the corners of the bends $10^c$ as at $10^d$ and $10^e$ respectively.

During the welding process the bends $10^a$ and $10^b$ are suitably clamped together by a suitable clamping device, as indicated in dotted lines in Fig. 3.

In the modification shown in Figs. 4–6 the opposite edge of one of the plates, as $10^2$, is formed with tenons or joggles $10^f$, alternately bent up and down, so that the upwardly bent joggles will engage through the recesses or slots $10^b$ of plate 10, while the downwardly bent joggles will engage the lower face of said plate. Thereby a more effective interlocking is produced than by the construction shown in Figs. 1–3. The welding is continuous along the corner of the bend $10^a$ at the bottom of the plates as at $10^g$ and intermittent on top and bottom of the plates along the edges of the joggles $10^f$, as at $10^h$, $10^i$.

For all ordinary construction, such as bulkheads or the like, the welding at $10^h$, $10^i$ will suffice. In case it is desired to produce water and oiltight joints full continuous welding at $10^g$ and intermittent welding at one side of the plate 10 are employed.

With double joggle plates the latter are held tightly together during the welding process by means of wedges 11 which are driven through the recesses $10^b$ as indicated by dotted lines.

My new method of joining plates together has the advantage that the shear is taken up entirely by the interlocked bends and thus the welds are relieved from this stress and used merely for tightening purposes.

Another advantage of my method is that a perfectly smooth seam is produced, which is strengthened by the bend along the seam.

It is understood that the method may be modified in various ways without departing from the principle of my invention and I, therefore, do not wish to restrict myself to the details described and shown.

What I claim is:—

1. A method of joining plates or the like together, consisting in providing one plate with a recessed bend and the other plate with a plurality of spaced bends, passing the latter through said recesses so as to interlock them and along said bends welding the plates together.

2. A method of joining metal plates or the like together, consisting in forming along the edge of one plate a single bend and along the opposite edge of the other plate a number of bends, providing recesses at the corner of the first named bend, then passing the bends of the second plate through said recesses, then temporarily clamping said interlocked bends together and finally welding along said bends.

In testimony whereof I affix my signature.

GUSTAV MEIER.